US012577879B1

(12) United States Patent
Fang et al.

(10) Patent No.: US 12,577,879 B1
(45) Date of Patent: Mar. 17, 2026

(54) COMPOSITE TIP AND TRAILING EDGE REINFORCEMENT FOR COMPOSITE FAN BLADE

(71) Applicant: RTX Corporation, Farmington, CT (US)

(72) Inventors: Xiaomei Fang, South Glastonbury, CT (US); Xuetao Li, South Glastonbury, CT (US); Scott A. Smith, Plantsville, CT (US); Po-Ching Yeh, Woodbridge, CT (US); Ji Won Mok, Rocky Hill, CT (US)

(73) Assignee: RTX Corporation, Farmington, CT (US)

( * ) Notice: Subject to any disclaimer, the term of this patent is extended or adjusted under 35 U.S.C. 154(b) by 0 days.

(21) Appl. No.: 19/256,628

(22) Filed: Jul. 1, 2025

(51) Int. Cl.
*F01D 5/28* (2006.01)

(52) U.S. Cl.
CPC .......... *F01D 5/282* (2013.01); *F05D 2230/23* (2013.01); *F05D 2300/603* (2013.01)

(58) Field of Classification Search
None
See application file for complete search history.

(56) References Cited

U.S. PATENT DOCUMENTS 8,647,070 B2 * 2/2014 Jevons .................. F04D 29/324 416/224
11,466,576 B2 * 10/2022 Stilin ...................... F04D 19/02
12,000,303 B2 6/2024 Rakotoarisoa et al.
12,006,841 B2 6/2024 Postec et al.
2011/0052405 A1 3/2011 Parkin
2011/0194941 A1 * 8/2011 Parkin ................... F04D 29/023 416/224
2011/0299994 A1 * 12/2011 Behnisch ................ F01D 5/288 29/889.71
2016/0032729 A1 * 2/2016 Turner .................... F01D 5/282 29/889.71
2020/0157953 A1 * 5/2020 Jain ......................... F01D 5/288

* cited by examiner

*Primary Examiner* — Courtney D Heinle
*Assistant Examiner* — Danielle M. Christensen
(74) *Attorney, Agent, or Firm* — Bachman & LaPointe, P.C.

(57) ABSTRACT

A composite tip and trailing edge reinforcement wrap for a composite fan blade including a non-woven composite main body forming an airfoil portion above a flow path and a tip adjacent the airfoil portion opposite a root portion; the airfoil portion defines a blade chord between a leading edge and a trailing edge, a concave pressure side and a convex suction side defined between the leading edge and the trailing edge, a blade span between the root portion and the tip; a metallic sheath attached to a main body outer surface proximate the leading edge; the composite tip and trailing edge reinforcement wrap attached to the main body outer surface located from the trailing edge and extends across the airfoil portion chordwise from the trailing edge to portions of the metallic sheath and extends spanwise from the tip along the airfoil portion to a predetermined distance of the blade span.

20 Claims, 7 Drawing Sheets

COMPOSITE TIP AND TRAILING EDGE REINFORCEMENT FOR COMPOSITE FAN BLADE

BACKGROUND

The present disclosure is directed to the improved composite tip and trailing edge reinforcement for a composite fan blade.

Composite fan blades fabricated using fabric or tape prepreg require novel methods of improving through-thickness impact capability and damage tolerance. During impact, tip and trailing edge deflections can cause delamination of plies, leading to excess damage and limitations to fly-back thrust capability.

Current composite fan blade tip and trailing edge protection uses adhesively bonded titanium or other metallic tip caps. Metallic tip caps add significant weight to the blade. The complex machining required to create titanium details leads to high manufacturing cost.

Initial impact testing of conventional designs has indicated liberation of heavy metal details in highly dynamic impact events can create additional damage risk to adjacent hardware.

SUMMARY

In accordance with the present disclosure, there is provided a composite tip and trailing edge reinforcement wrap for a composite fan blade comprising a root portion below a flow path and an airfoil portion above the flow path and a tip adjacent the airfoil portion opposite the root portion; a non-woven composite main body forming the airfoil portion, the non-woven composite main body including a main body outer surface, the airfoil portion defines a blade chord between a leading edge and a trailing edge; the airfoil portion defines a concave pressure side and a convex suction side defined between the leading edge and the trailing edge, the airfoil portion defines a blade span between the root portion and the tip; a metallic sheath attached to the main body outer surface proximate the leading edge; and the composite tip and trailing edge reinforcement wrap attached to the main body outer surface, the composite tip and trailing edge reinforcement wrap located from the trailing edge and extends across the airfoil portion chordwise from the trailing edge to portions of the leading edge sheath and extends spanwise from the tip along the airfoil portion to a predetermined distance of the blade span.

A further embodiment of any of the foregoing embodiments may additionally and/or alternatively include the composite tip and trailing edge reinforcement wrap for a composite fan blade further comprising a skin attached to the non-woven composite main body at the main body outer surface.

A further embodiment of any of the foregoing embodiments may additionally and/or alternatively include the composite tip and trailing edge reinforcement wrap is attached to the skin opposite the main body outer surface.

A further embodiment of any of the foregoing embodiments may additionally and/or alternatively include the metallic sheath is attached to the skin opposite the main body outer surface.

A further embodiment of any of the foregoing embodiments may additionally and/or alternatively include the skin is only located between the metallic sheath and the composite tip and trailing edge reinforcement wrap.

A further embodiment of any of the foregoing embodiments may additionally and/or alternatively include the metallic sheath overlaps the composite tip and trailing edge reinforcement wrap from about 5 percent to about 50 percent of the chordwise width of the metallic sheath proximate a suction side flank and a pressure side flank.

A further embodiment of any of the foregoing embodiments may additionally and/or alternatively include the composite tip and trailing edge reinforcement wrap extends spanwise from the tip along the airfoil portion from about 50 percent to about 80 percent of the blade span and wherein the composite tip and trailing edge reinforcement wrap covers the airfoil portion at a location from about 40 percent to 50 percent of the span from the tip and from the trailing edge about 50 percent to 100 percent chordwise from; and wherein the composite tip and trailing edge reinforcement wrap covers the airfoil portion at a location from about 50 percent to about 80 percent of the span from the tip and from about 50 percent tapering to zero chordwise from the trailing edge.

In accordance with the present disclosure, there is provided a composite tip and trailing edge reinforcement wrap for a composite fan blade comprising a root portion below a flow path and an airfoil portion above the flow path and a tip adjacent the airfoil portion opposite the root portion; a non-woven composite main body forming the airfoil portion, the non-woven composite main body including a main body outer surface, the airfoil portion defines a blade chord between a leading edge and a trailing edge; the airfoil portion defines a concave pressure side and a convex suction side defined between the leading edge and the trailing edge, the airfoil portion defines a blade span between the root portion and the tip; a skin attached the non-woven composite main body at the main body outer surface; a metallic sheath attached to the skin opposite the main body outer surface proximate the leading edge; and the composite tip and trailing edge reinforcement wrap attached to the skin opposite the main body outer surface, the composite tip and trailing edge reinforcement wrap located from the trailing edge and extends across the airfoil portion chordwise from the trailing edge to portions of the leading edge sheath and extends spanwise from the tip along the airfoil portion to a predetermined distance of the blade span.

A further embodiment of any of the foregoing embodiments may additionally and/or alternatively include the metallic sheath overlaps the composite tip and trailing edge reinforcement wrap from about 5 percent to about 50 percent of the chordwise width of the metallic sheath proximate a suction side flank and a pressure side flank.

A further embodiment of any of the foregoing embodiments may additionally and/or alternatively include the composite tip and trailing edge reinforcement wrap extends spanwise from the tip along the airfoil portion from about 50 percent to about 80 percent of the blade span.

A further embodiment of any of the foregoing embodiments may additionally and/or alternatively include the composite tip and trailing edge reinforcement wrap covers the airfoil portion at a location from about 40 percent to 50 percent of the span from the tip and from the trailing edge chordwise from about 100 percent to about 50 percent.

A further embodiment of any of the foregoing embodiments may additionally and/or alternatively include the composite tip and trailing edge reinforcement wrap covers the airfoil portion at a location from about 50 percent to about 80 percent of the span from the tip and from the trailing edge chordwise from about 50 percent tapering to zero.

A further embodiment of any of the foregoing embodiments may additionally and/or alternatively include the skin includes a skin overlap proximate the trailing edge.

In accordance with the present disclosure, there is provided a process for forming a composite tip and trailing edge reinforcement wrap for a composite fan blade comprising forming a root portion below a flow path and an airfoil portion above the flow path and a tip adjacent the airfoil portion opposite the root portion; forming the airfoil portion from a non-woven composite main body, the non-woven composite main body including a main body outer surface, the airfoil portion defines a blade chord between a leading edge and a trailing edge; the airfoil portion defines a concave pressure side and a convex suction side defined between the leading edge and the trailing edge, the airfoil portion defines a blade span between the root portion and the tip; attaching a composite woven skin to the non-woven composite main body at the main body outer surface; attaching a metallic sheath to the composite woven skin opposite the main body outer surface proximate the leading edge; and attaching the composite tip and trailing edge reinforcement wrap to the composite woven skin opposite the core outer surface; and locating the composite tip and trailing edge reinforcement wrap from the trailing edge and extending across the airfoil portion chordwise from the trailing edge to portions of the leading edge sheath and extending spanwise from the tip along the airfoil portion to a predetermined distance of the blade span.

A further embodiment of any of the foregoing embodiments may additionally and/or alternatively include the process further comprising overlapping the composite tip and trailing edge reinforcement wrap with the metallic sheath from about 5 percent to about 50 percent of the chordwise width of the metallic sheath proximate a suction side flank and a pressure side flank.

A further embodiment of any of the foregoing embodiments may additionally and/or alternatively include the process further comprising extending the composite tip and trailing edge reinforcement wrap spanwise from the tip along the airfoil portion from about 50 percent to about 80 percent of the blade span.

A further embodiment of any of the foregoing embodiments may additionally and/or alternatively include the process further comprising covering the airfoil portion with the composite tip and trailing edge reinforcement wrap at a location from about 40 percent to 50 percent of the span from the tip and from the trailing edge chordwise from about 100 percent to about 50 percent.

A further embodiment of any of the foregoing embodiments may additionally and/or alternatively include the process further comprising covering the airfoil portion with the composite tip and trailing edge reinforcement wrap at a location from about 50 percent to about 80 percent of the span from the tip and from the trailing edge chordwise from about 50 percent tapering to zero.

A further embodiment of any of the foregoing embodiments may additionally and/or alternatively include the process further comprising forming a skin overlap proximate the trailing edge.

A further embodiment of any of the foregoing embodiments may additionally and/or alternatively include the process further comprising forming the non-woven main body with interleaved plies, where interleaving comprises distributing wide plies within narrow plies and short plies within long plies in the composite fan blade.

Other details of the composite tip and trailing edge reinforcement for a composite fan blade are set forth in the following detailed description and the accompanying drawings wherein like reference numerals depict like elements.

BRIEF DESCRIPTION OF THE DRAWINGS

The above and further advantages of this disclosure may be better understood by referring to the following description in conjunction with the accompanying drawings, in which like reference numerals indicate like elements and features in the various figures. Letters may be appended to reference numbers to distinguish from reference numbers for similar features and to indicate a correspondence to other features in the drawings. The embodiments shown in the individual figures are not limiting and can be combined to reflect a blended concept. For clarity, not every element may be labeled in every figure. The drawings are not necessarily to scale, emphasis instead being placed upon illustrating the principles of the disclosure.

DETAILED DESCRIPTION

Figure 1:
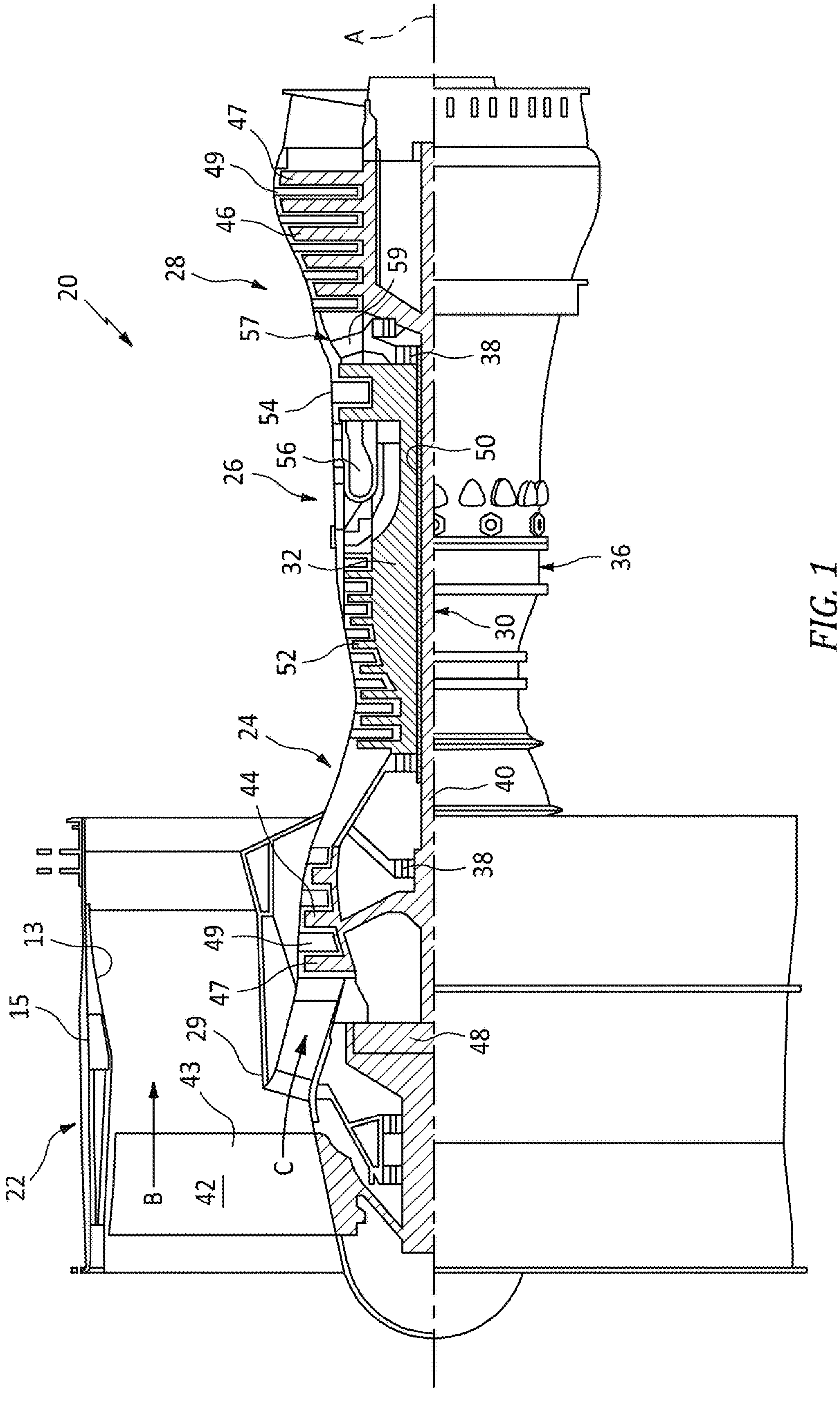
FIG. 1 is a cross section schematic view of an example turbine engine embodiment.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. The fan section 22 may include a single-stage fan 42 having a plurality of fan blades 43. The fan blades 43 may have a fixed stagger angle or may have a variable pitch to direct incoming airflow from an engine inlet. The fan 42 drives air along a bypass flow path B in a bypass duct 13 defined within a housing 15 such as a fan case or nacelle and also drives air along a core flow path C for compression and communication into the combustor section 26 then expansion through the turbine section 28. A splitter 29 aft of the fan 42 divides the air between the bypass flow path B and the core flow path C. The housing 15 may surround the fan 42 to establish an outer diameter of the bypass duct 13. The splitter 29 may establish an inner diameter of the bypass duct 13. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects, a first (or low) pressure compressor 44 and a first (or low) pressure turbine 46. The inner shaft 40 is connected to the fan 42 through a speed change mechanism, which in the exemplary gas turbine engine 20 is illustrated as a geared architecture 48 to drive the fan 42 at a lower speed than the low speed spool 30. The inner shaft 40 may interconnect the low pressure compressor 44 and low pressure turbine 46 such that the low pressure compressor 44 and low pressure turbine 46 are rotatable at a common speed and in a common direction. In other embodiments, the low pressure turbine 46 drives both the fan 42 and low pressure compressor 44 through the geared architecture 48 such that the fan 42 and low pressure compressor 44 are rotatable at a common speed. Although this application discloses geared architecture 48, its teaching may benefit direct drive engines having no geared architecture. The high speed spool 32 includes an outer shaft 50 that interconnects a second (or high) pressure compressor 52 and a second (or high) pressure turbine 54. A combustor 56 is arranged in the exemplary gas turbine 20 between the high pressure compressor 52 and the high pressure turbine 54. A mid-turbine frame 57 of the engine static structure 36 may be arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

Airflow in the core flow path C is compressed by the low pressure compressor 44 then the high pressure compressor 52, mixed and burned with fuel in the combustor 56, then expanded through the high pressure turbine 54 and low pressure turbine 46. The mid-turbine frame 57 includes airfoils 59 which are in the core flow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of the low pressure compressor, or aft of the combustor section 26 or even aft of turbine section 28, and fan 42 may be positioned forward or aft of the location of gear system 48.

The low pressure compressor 44, high pressure compressor 52, high pressure turbine 54 and low pressure turbine 46 each include one or more stages having a row of rotatable airfoils. Each stage may include a row of static vanes adjacent the rotatable airfoils. The rotatable airfoils and vanes are schematically indicated at 47 and 49.

Figure 2:
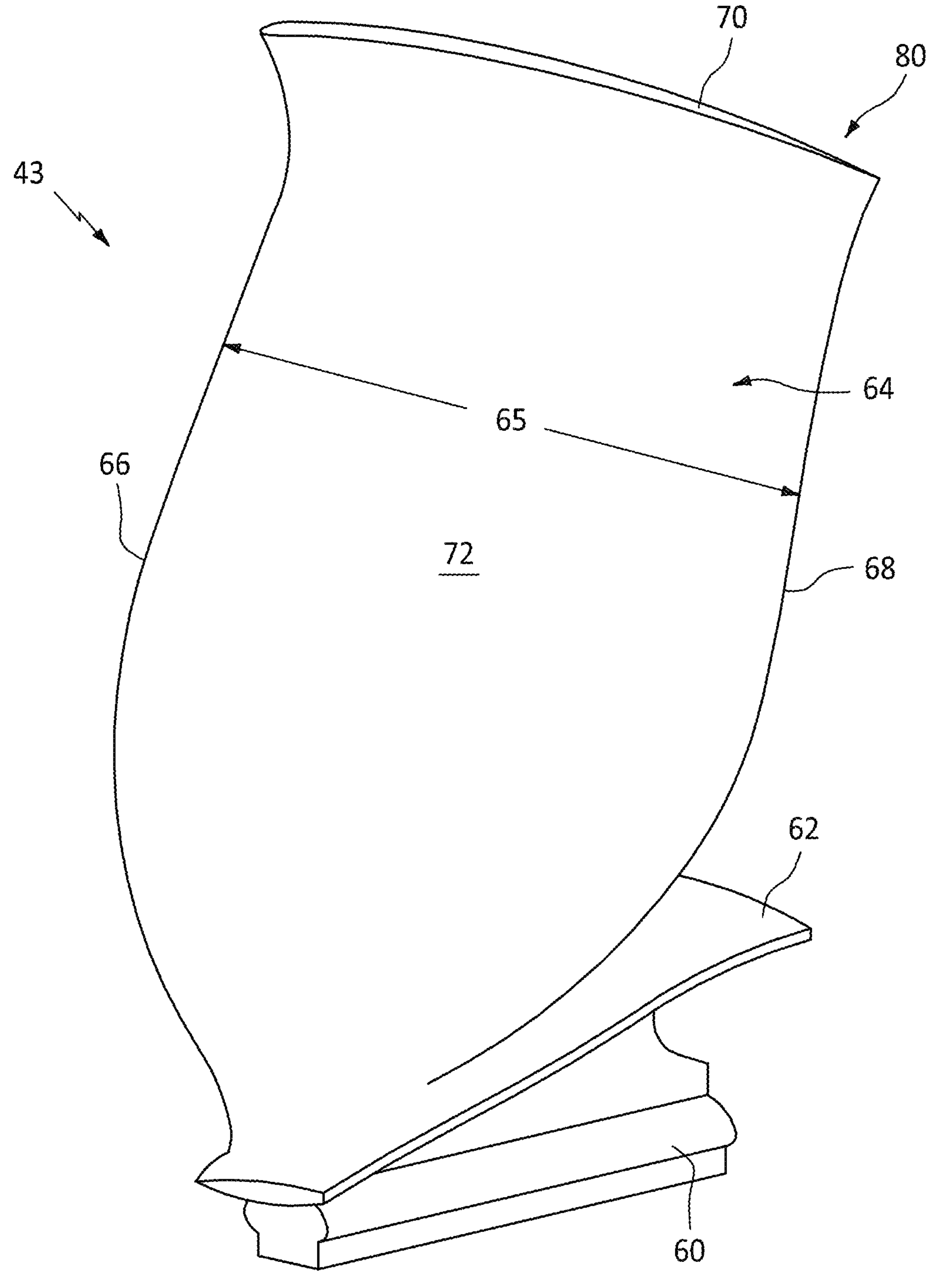
FIG. 2 is a schematic view of a fan blade for use in the gas turbine engine shown in FIG. 1.
Figure 3:
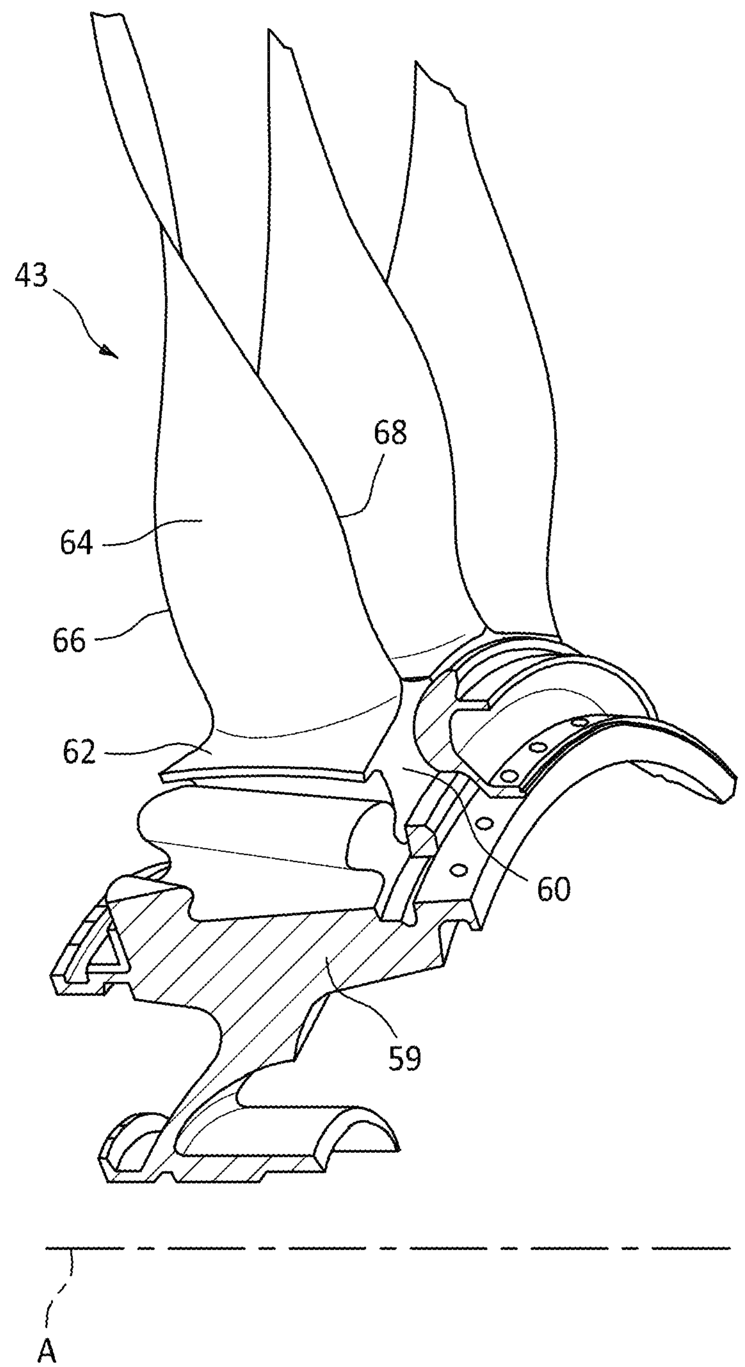
FIG. 3 is a perspective view of a rotor disk with the fan blade of FIG. 2 installed.
Figure 4:
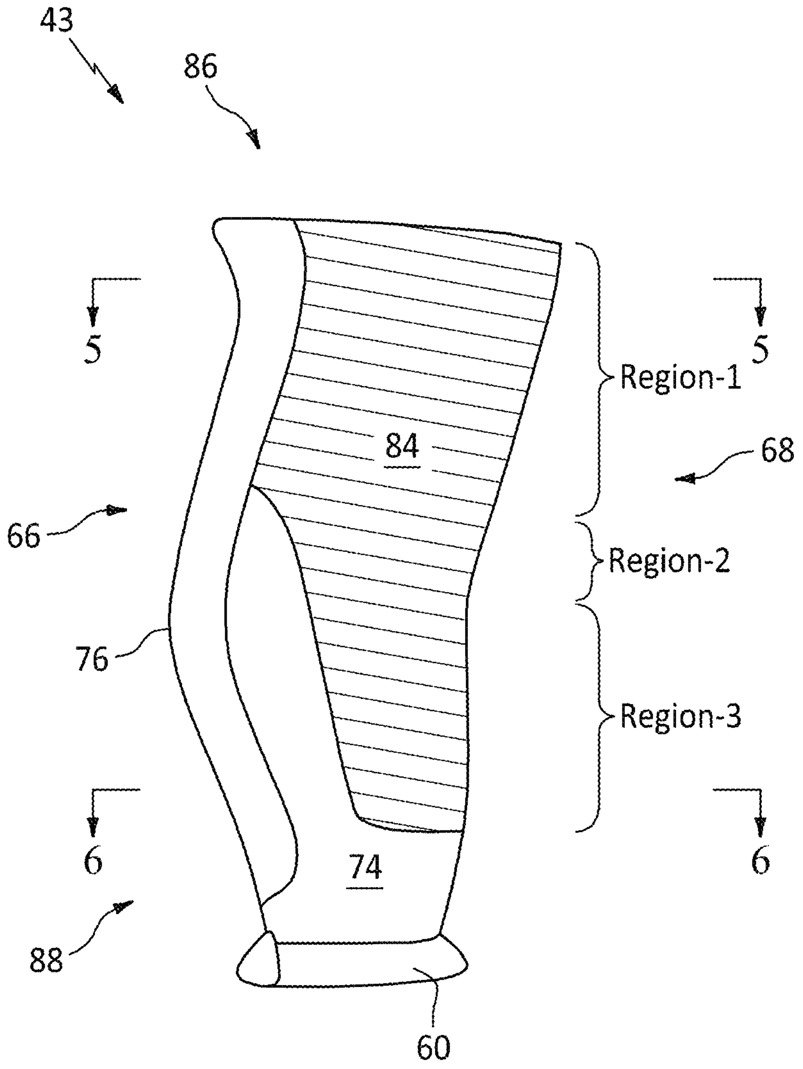
FIG. 4 is a schematic representation of an exemplary composite fan blade with composite tip and trailing edge reinforcement.

Referring also to FIG. 2, FIG. 3 and FIG. 4, the fan section 22 includes a plurality of circumferentially spaced fan blades 43 which may be made of a high-strength, low weight material such as a composite material. It should be understood that although a single fan stage typical of a high bypass gas turbofan engine architecture is illustrated and described in the disclosed embodiments, other stages which have other blades inclusive but not limited to fan blades, and stators which may also benefit from the disclosure.

Each fan blade 43 generally includes an innermost root portion 60, an intermediate platform portion flow path 62 (may or may not be integral to fan blade 43), and an outermost airfoil portion 64. In one form, the root portion 60 defines an attachment such as an inverted fir tree, bulb, or dovetail, so the fan blade 43 is slidably received in a complimentary configured recess provided in a fan rotor 59 (FIG. 3). The platform portion flow path 62 generally separates the root portion 60 and the airfoil portion 64 to define an inner boundary of the air flow path 62. The airfoil portion 64 defines a blade chord 65 between a leading edge 66, which may include various forward and/or aft sweep configurations, and a trailing edge 68. A concave pressure side 70 and a convex suction side 72 are defined between the leading edge 66 and the trailing edge 68. Although the fan blade 43 is illustrated in the disclosed non-limiting embodiment, compressor blades, turbofan blades, turboprop propeller blades, tilt rotor props, vanes, struts, and other airfoils may benefit from the disclosed composite tip and trailing edge reinforcement.

Referring also to FIG. 4, the fan blade 43 can be constructed from composite material 74. The composite material 74 can include polymer matrix composite material for fan blades 43. The polymer matrix composites are materials made up of fibers that are embedded in an organic polymer matrix. These fibers are introduced to enhance selected properties of the material. Polymers are reinforced with fibers which can be continuous multi-filaments and other types of preformed textiles, or unidirectional tape. These fibers with pre-impregnated polymer resin matrix, can be consolidated under pressing such as autoclave or compression molding and then cured to produce the final composite. The composite material body 74 can be non-woven to include interleaved plies, where interleaving comprises distributing wide plies within narrow plies and short plies within long plies in the fan blade 43. The interleaving is defined as an actual intersection of a plurality of plies of different variable dimensions that extend in the chordwise direction with another plurality of plies of different variable dimensions that extend in the spanwise direction such that their respective longitudinal axes intersect with one another at angles of 5 to 175 degrees.

A leading edge sheath 76 can be attached to the fan blade 43 proximate the leading edge 66 of the fan blade 43. The leading edge sheath 76 can include metal material capable of being attached to the fan blade 43. The leading edge sheath 76 encapsulates the fan blade 43 polymer matrix composite material body 74. The leading edge sheath 76 can contain a solid metal along the leading edge 66, a suction side flank 78 and a pressure side flank 80, bonded with the composite blade 43 with an adhesive 82.

A composite tip and trailing edge reinforcement wrap or simply composite wrap 84 can be attached to the fan blade 43. The composite wrap 84 can be located across the airfoil portion 64 from the trailing edge 68 and extend across the airfoil portion 64 chordwise from the trailing edge to the leading edge sheath 76. In the locations where the composite wrap 84 extends to the leading edge sheath 76, the leading edge sheath 76 overlaps the composite wrap 84.

In the exemplary embodiment at FIG. 4, a region 1 is located from a tip 86 of the blade 43 to about forty percent of a span 88 of the blade 43. The span 88 extends from the root portion 60 to the tip 86. The composite wrap 84 can cover the blade 43 chordwise from the trailing edge 68 to beneath the leading edge sheath 76. The composite wrap 84 can be overlapped by the leading edge sheath 76 at both of the suction side flank 78 and the pressure side flank 80 from about ten percent to about fifty percent of the chordwise width of the leading edge sheath 76 flanks 78, 80.

In the exemplary embodiment shown as region 2 in FIG. 4, region 2 is located on the blade 43 from about forty percent to about fifty percent measured from the tip 86 spanwise. The composite wrap 84 can cover the blade 43 from the trailing edge 68 chordwise from about one hundred percent to about fifty percent.

In the exemplary embodiment shown as region 3 in FIG. 4, region 3 is located on the blade 43 from about fifty percent to about eighty percent of the span 88 from the tip 86 spanwise. The composite wrap 84 can cover the blade 43 from the trailing edge 68 chordwise from about thirty percent and about fifty percent.

Figure 5:
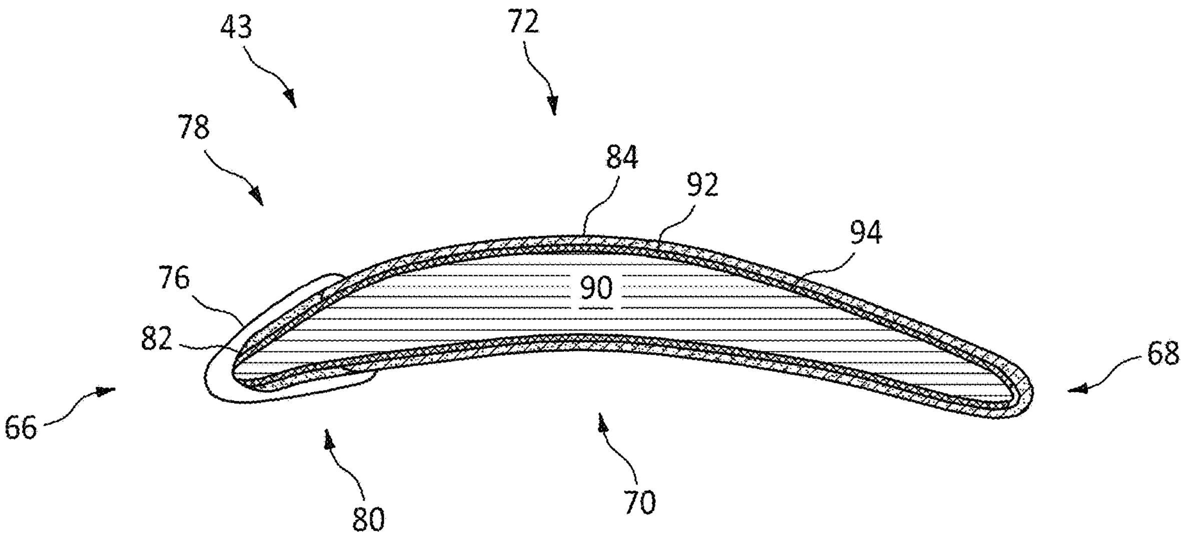
FIG. 5 is a cross section 5-5 schematic representation of the exemplary fan blade with composite tip and trailing edge reinforcement shown in FIG. 4.

Referring also to FIG. 5, showing the cross section of the blade 43 of FIG. 4. The exemplary embodiment of FIG. 5 includes a core/main body 90 of the fan blade 43. The main body 90 can be nearly encapsulated with a composite woven fabric skin or simply skin 92 on a main body outer surface 94. The thickness of the woven skin 92 can be from about 0.005 inch to about 0.025 inch. The composite wrap 84 is shown attached to the skin 92 opposite the main body outer surface 94 from the trailing edge 68 chordwise toward the leading edge terminating beneath the leading edge sheath 76. The leading edge sheath 76 is shown overlapping the composite wrap 84. The composite wrap 84 can be co-cured or bonded to the skin 92 with adhesive.

Figure 6:
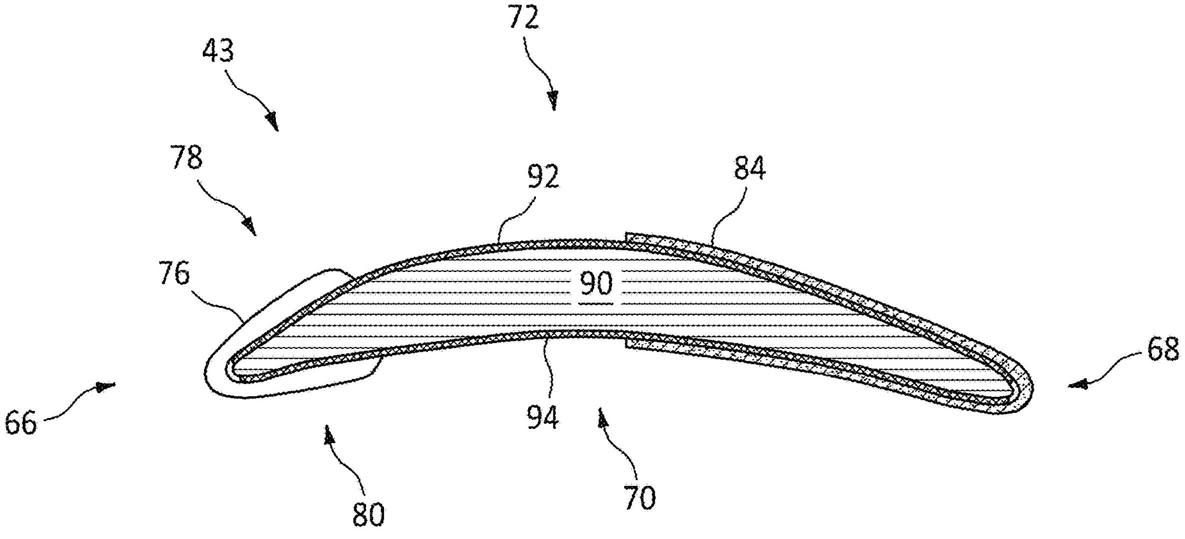
FIG. 6 is a cross section 6-6 schematic representation of an exemplary fan blade with composite tip and trailing edge reinforcement shown in FIG. 4.

Referring also to FIG. 6, showing the cross section of the blade 43 of FIG. 4. The exemplary embodiment of FIG. 5 includes the main body 90 of the fan blade 43. The main body 90 can be encapsulated with the skin 92 on the main body outer surface 94. The composite wrap 84 is shown as encapsulating the skin 92 proximate the trailing edge 68 and extending chordwise across a portion of the fan blade 43. The composite wrap 84 does not extend to the leading edge sheath 76.

Figure 7:
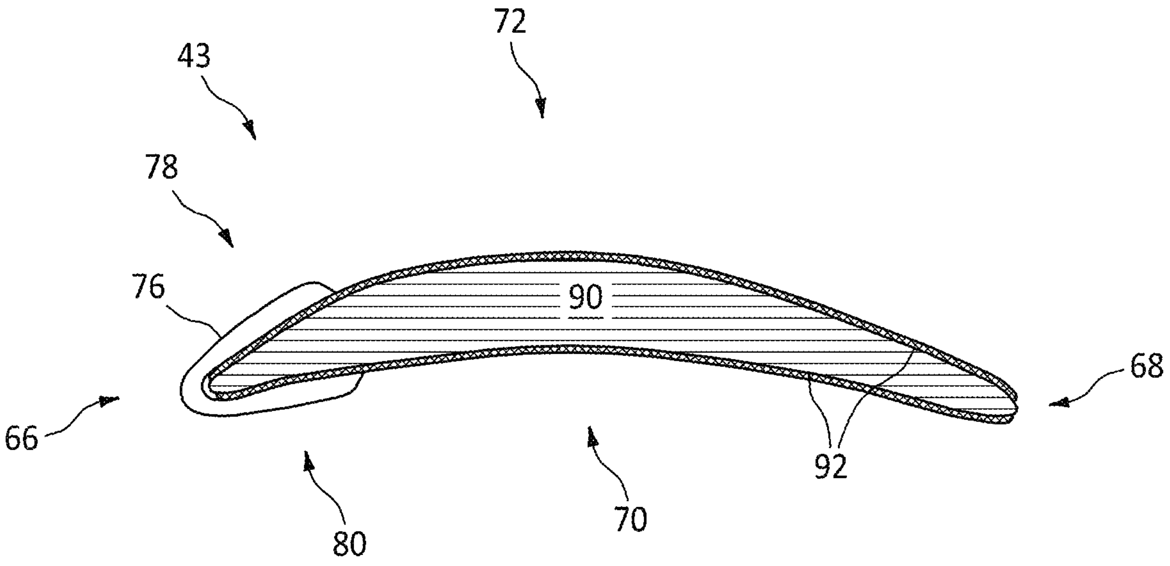
FIG. 7 is a cross section schematic representation of an exemplary fan blade with skin layer.

Referring also to FIG. 7 showing an exemplary embodiment of the main body 90 with the skin 92. The skin 92 covers the main body outer surface 94. The leading edge sheath 76 covers a portion of the skin 92 proximate the leading edge 66.

Figure 8:
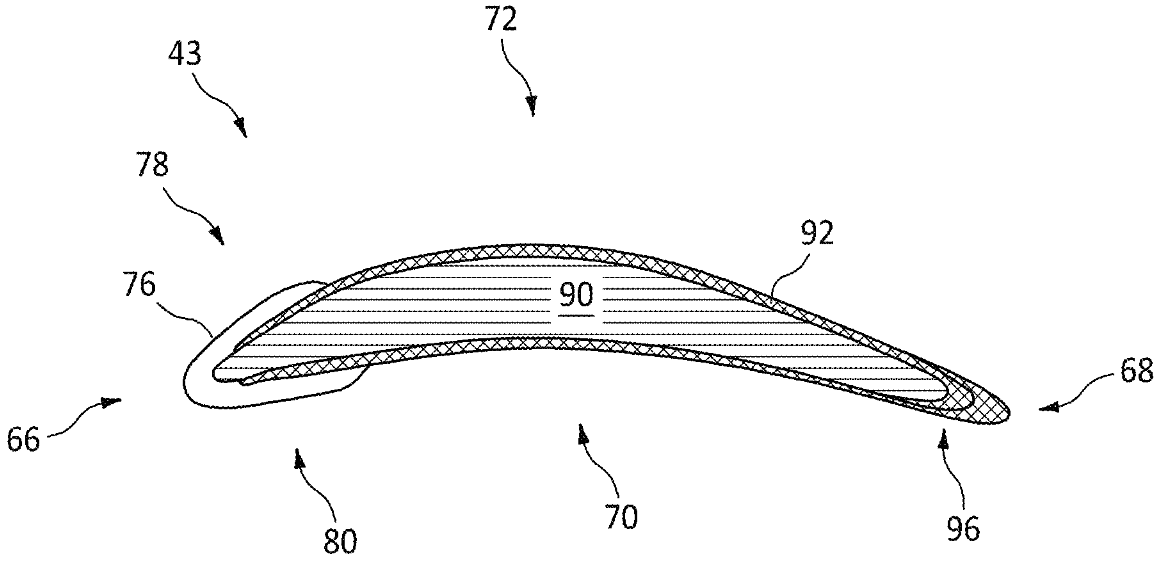
FIG. 8 is a cross section schematic representation of an exemplary fan blade with overlapped skin layers.

Referring also to FIG. 8 showing an exemplary embodiment of the main body 90 with the skin 92. The skin 92 can be seen with a skin overlap 96 proximate the trailing edge 68. The skin 92 can be overlapped proximate the trailing edge. The leading edge sheath 76 covers a portion of the skin 92 proximate the leading edge 66.

Figure 9:
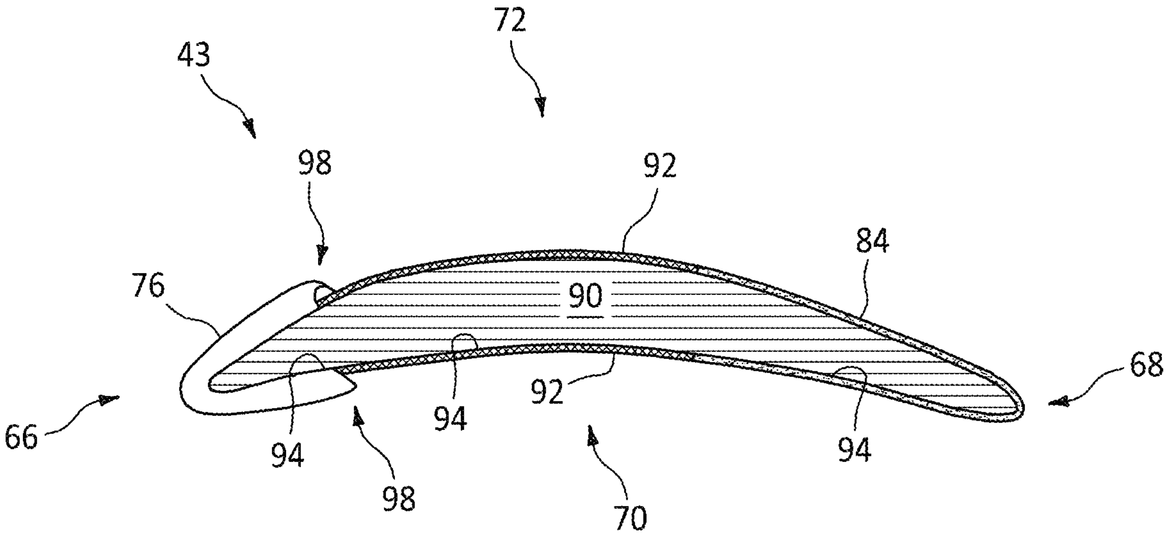
FIG. 9 is a cross section schematic representation of an exemplary fan blade with composite tip and trailing edge reinforcement.

Referring also to FIG. 9 showing an exemplary embodiment of the main body 90 with the skin 92. The composite wrap 84 directly contacts the core outer surface 94 proximate the trailing edge 68. The leading edge sheath directly contacts the core outer surface 94 proximate the leading edge 66. The skin 92 covers the core outer surface 94 in locations between the composite wrap 84 and the leading edge sheath 76. The skin 92 can be overlapped by the leading edge sheath 76 along margins 98 at the suction side flank 78 and pressure side flank 80, with the majority of the leading edge sheath 76 directly contacts the main body outer surface 94.

The composite wrap 84 comprises composite plies wrapped around the tip 86 and trailing edge 68 can be unidirectional tapes, 2 by 2 twill, 4 harness or 8 harness satin weave fabric or other similar fabric styles. Spread-tow reinforcement can be applied as well to further reduce ply thickness and increase ply drapability. If unidirectional tape is applied, unitape should wrap around the trailing edge 68 by placing 0 degree fiber along the chordwise direction. If twill or satin weave is applied, woven fabric can wrap around the trailing edge 68 using different fiber angles, for example, 45 degrees along the chordwise direction can be considered. Continuous fiber wrapping around the trailing edge 68 corner to reduce local delamination risk due to impact-induced out-of-plane displacement. At the tip 86 portion, extension of the continuous fiber wrapping around the trailing edge 68 corner under the metallic leading edge sheath 76 is to prevent peel initiation during impact. The main body 90 can be fabricated using the techniques disclosed in publication number US 2023/0051131 A1 incorporated by reference herein.

A technical advantage of the disclosed composite tip and trailing edge reinforcement for a composite fan blade includes a composite material wrapping around the trailing edge corner and increasing reinforcement around tip edge that reduces the risk of delamination around the tip and the trailing edge.

Another technical advantage of the disclosed composite tip and trailing edge reinforcement for a composite fan blade includes an enhancement of impact resistance for the blade.

Another technical advantage of the disclosed composite tip and trailing edge reinforcement for a composite fan blade includes a composite material which reduces weight as compared to a metallic tip cap.

Another technical advantage of the disclosed composite tip and trailing edge reinforcement for a composite fan blade includes the capacity to be constructed with a tailored fiber structure.

There has been provided a composite tip and trailing edge reinforcement for a composite fan blade. While the composite tip and trailing edge reinforcement for a composite fan blade has been described in the context of specific embodiments thereof, other unforeseen alternatives, modifications, and variations may become apparent to those skilled in the art having read the foregoing description. The embodiments can be interchanged and combined. Accordingly, it is intended to embrace those alternatives, modifications, and variations which fall within the broad scope of the appended claims.

What is claimed is:

1. A composite tip and trailing edge reinforcement wrap for a composite fan blade comprising:

a root portion below a flow path and an airfoil portion above the flow path and a tip adjacent the airfoil portion opposite the root portion;

a non-woven composite main body forming the airfoil portion, the non-woven composite main body including a main body outer surface, the airfoil portion defines a blade chord between a leading edge and a trailing edge; the airfoil portion defines a concave pressure side and a convex suction side defined between the leading edge and the trailing edge, the airfoil portion defines a blade span between the root portion and the tip;

a metallic sheath attached to the main body outer surface proximate the leading edge;

the composite tip and trailing edge reinforcement wrap attached to the main body outer surface, the composite tip and trailing edge reinforcement wrap located from the trailing edge and extends across the airfoil portion chordwise from the trailing edge to portions of the metallic sheath and extends spanwise from the tip along the airfoil portion to a predetermined distance of the blade span; and a skin attached to the non-woven composite main body at the main body outer surface; wherein the skin is only located between the metallic sheath and the composite tip and trailing edge reinforcement wrap.

2. The composite tip and trailing edge reinforcement wrap for the composite fan blade according to claim 1, wherein the composite tip and trailing edge reinforcement wrap is attached to the skin opposite the main body outer surface.

3. The composite tip and trailing edge reinforcement wrap for the composite fan blade according to claim 1, wherein the metallic sheath is attached to the skin opposite the main body outer surface.

4. The composite tip and trailing edge reinforcement wrap for the composite fan blade according to claim 1, wherein the metallic sheath overlaps the composite tip and trailing edge reinforcement wrap from about 5 percent to about 50 percent of the chordwise width of the metallic sheath proximate a suction side flank and a pressure side flank.

5. The composite tip and trailing edge reinforcement wrap for the composite fan blade according to claim 1, wherein the composite tip and trailing edge reinforcement wrap extends spanwise from the tip along the airfoil portion from about 50 percent to about 80 percent of the blade span and wherein the composite tip and trailing edge reinforcement wrap covers the airfoil portion at a location from about 40 percent to 50 percent of the span from the tip and from the trailing edge chordwise from about 100 percent to about 50 percent; and wherein the composite tip and trailing edge reinforcement wrap covers the airfoil portion at a location from about 50 percent to about 80 percent of the span from the tip and from the trailing edge chordwise from about 50 percent tapering to zero.

6. A composite tip and trailing edge reinforcement wrap for a composite fan blade comprising:

a root portion below a flow path and an airfoil portion above the flow path and a tip adjacent the airfoil portion opposite the root portion;

a non-woven composite main body forming the airfoil portion, the non-woven composite main body including a main body outer surface, the airfoil portion defines a blade chord between a leading edge and a trailing edge; the airfoil portion defines a concave pressure side and a convex suction side defined between the leading edge and the trailing edge, the airfoil portion defines a blade span between the root portion and the tip;

a skin attached the non-woven composite main body at the main body outer surface;

a metallic sheath attached to the skin opposite the main body outer surface proximate the leading edge; and the composite tip and trailing edge reinforcement wrap attached to the skin opposite the main body outer surface, the composite tip and trailing edge reinforcement wrap located from the trailing edge and extends across the airfoil portion chordwise from the trailing edge to portions of the metallic sheath and extends spanwise from the tip along the airfoil portion to a predetermined distance of the blade span; wherein the metallic sheath overlaps the composite tip and trailing edge reinforcement wrap from about 5 percent to about 50 percent of the chordwise width of the metallic sheath proximate a suction side flank and a pressure side flank.

7. The composite tip and trailing edge reinforcement wrap for the composite fan blade according to claim 6, wherein the composite tip and trailing edge reinforcement wrap extends spanwise from the tip along the airfoil portion from about 50 percent to about 80 percent of the blade span.

8. The composite tip and trailing edge reinforcement wrap for the composite fan blade according to claim 6, wherein the composite tip and trailing edge reinforcement wrap covers the airfoil portion at a location from about 40 percent to 50 percent of the span from the tip and from the trailing edge chordwise from about 100 percent to about 50 percent.

9. The composite tip and trailing edge reinforcement wrap for the composite fan blade according to claim 6, wherein the composite tip and trailing edge reinforcement wrap covers the airfoil portion at a location from about 50 percent to about 80 percent of the span from the tip and from the trailing edge chordwise from about 50 percent tapering to zero.

10. The composite tip and trailing edge reinforcement wrap for the composite fan blade according to claim 6, wherein the skin includes a skin overlap proximate the trailing edge.

11. A process for forming a composite tip and trailing edge reinforcement wrap for a composite fan blade comprising:

forming a root portion below a flow path and an airfoil portion above the flow path and a tip adjacent the airfoil portion opposite the root portion;

forming the airfoil portion from a non-woven composite main body, the non-woven composite main body including a main body outer surface, the airfoil portion defines a blade chord between a leading edge and a trailing edge; the airfoil portion defines a concave pressure side and a convex suction side defined between the leading edge and the trailing edge, the airfoil portion defines a blade span between the root portion and the tip;

attaching a composite woven skin to the non-woven composite main body at the main body outer surface;

attaching a metallic sheath to the composite woven skin opposite the main body outer surface proximate the leading edge; and attaching the composite tip and trailing edge reinforcement wrap to the composite woven skin opposite the core outer surface;

locating the composite tip and trailing edge reinforcement wrap from the trailing edge and extending across the airfoil portion chordwise from the trailing edge to portions of the metallic sheath and extending spanwise from the tip along the airfoil portion to a predetermined distance of the blade span; and forming the non-woven main body with interleaved plies, where interleaving comprises distributing wide plies within narrow plies and short plies within long plies in the composite fan blade.

12. The process of claim 11, further comprising:

overlapping the composite tip and trailing edge reinforcement wrap with the metallic sheath from about 5 percent to about 50 percent of the chordwise width of the metallic sheath proximate a suction side flank and a pressure side flank.

13. The process of claim 11, further comprising:

extending the composite tip and trailing edge reinforcement wrap spanwise from the tip along the airfoil portion from about 50 percent to about 80 percent of the blade span.

14. The process of claim 11, further comprising:

covering the airfoil portion with the composite tip and trailing edge reinforcement wrap at a location from about 40 percent to 50 percent of the span from the tip and from the trailing edge chordwise from about 100 percent to about 50 percent.

15. The process of claim 11, further comprising:

covering the airfoil portion with the composite tip and trailing edge reinforcement wrap at a location from about 50 percent to about 80 percent of the span from the tip and from the trailing edge chordwise from about 50 percent tapering to zero.

16. The process of claim 11, further comprising:

forming a skin overlap proximate the trailing edge.

17. A composite tip and trailing edge reinforcement wrap for a composite fan blade comprising:

a root portion below a flow path and an airfoil portion above the flow path and a tip adjacent the airfoil portion opposite the root portion;

a non-woven composite main body forming the airfoil portion, the non-woven composite main body including a main body outer surface, the airfoil portion defines a blade chord between a leading edge and a trailing edge; the airfoil portion defines a concave pressure side and a convex suction side defined between the leading edge and the trailing edge, the airfoil portion defines a blade span between the root portion and the tip;

a metallic sheath attached to the main body outer surface proximate the leading edge; and the composite tip and trailing edge reinforcement wrap attached to the main body outer surface, the composite tip and trailing edge reinforcement wrap located from the trailing edge and extends across the airfoil portion chordwise from the trailing edge to portions of the metallic sheath and extends spanwise from the tip along the airfoil portion to a predetermined distance of the blade span; wherein the composite tip and trailing edge reinforcement wrap extends spanwise from the tip along the airfoil portion from about 50 percent to about 80 percent of the blade span and wherein the composite tip and trailing edge reinforcement wrap covers the airfoil portion at a location from about 40 percent to 50 percent of the span from the tip and from the trailing edge chordwise from about 100 percent to about 50 percent; and wherein the composite tip and trailing edge reinforcement wrap covers the airfoil portion at a location from about 50 percent to about 80 percent of the span from the tip and from the trailing edge chordwise from about 50 percent tapering to zero.

18. A process for forming a composite tip and trailing edge reinforcement wrap for a composite fan blade comprising:

forming a root portion below a flow path and an airfoil portion above the flow path and a tip adjacent the airfoil portion opposite the root portion;

forming the airfoil portion from a non-woven composite main body, the non-woven composite main body including a main body outer surface, the airfoil portion defines a blade chord between a leading edge and a trailing edge; the airfoil portion defines a concave pressure side and a convex suction side defined between the leading edge and the trailing edge, the airfoil portion defines a blade span between the root portion and the tip;

attaching a composite woven skin to the non-woven composite main body at the main body outer surface;

attaching a metallic sheath to the composite woven skin opposite the main body outer surface proximate the leading edge; and attaching the composite tip and trailing edge reinforcement wrap to the composite woven skin opposite the core outer surface;

locating the composite tip and trailing edge reinforcement wrap from the trailing edge and extending across the airfoil portion chordwise from the trailing edge to portions of the metallic sheath and extending spanwise from the tip along the airfoil portion to a predetermined distance of the blade span; and extending the composite tip and trailing edge reinforcement wrap spanwise from the tip along the airfoil portion from about 50 percent to about 80 percent of the blade span.

19. A process for forming a composite tip and trailing edge reinforcement wrap for a composite fan blade comprising:

forming a root portion below a flow path and an airfoil portion above the flow path and a tip adjacent the airfoil portion opposite the root portion;

forming the airfoil portion from a non-woven composite main body, the non-woven composite main body including a main body outer surface, the airfoil portion defines a blade chord between a leading edge and a trailing edge; the airfoil portion defines a concave pressure side and a convex suction side defined between the leading edge and the trailing edge, the airfoil portion defines a blade span between the root portion and the tip;

attaching a composite woven skin to the non-woven composite main body at the main body outer surface;

attaching a metallic sheath to the composite woven skin opposite the main body outer surface proximate the leading edge; and attaching the composite tip and trailing edge reinforcement wrap to the composite woven skin opposite the core outer surface;

locating the composite tip and trailing edge reinforcement wrap from the trailing edge and extending across the airfoil portion chordwise from the trailing edge to portions of the metallic sheath and extending spanwise from the tip along the airfoil portion to a predetermined distance of the blade span; and covering the airfoil portion with the composite tip and trailing edge reinforcement wrap at a location from about 40 percent to 50 percent of the span from the tip and from the trailing edge chordwise from about 100 percent to about 50 percent.

20. A process for forming a composite tip and trailing edge reinforcement wrap for a composite fan blade comprising:

forming a root portion below a flow path and an airfoil portion above the flow path and a tip adjacent the airfoil portion opposite the root portion;

forming the airfoil portion from a non-woven composite main body, the non-woven composite main body including a main body outer surface, the airfoil portion defines a blade chord between a leading edge and a trailing edge; the airfoil portion defines a concave pressure side and a convex suction side defined between the leading edge and the trailing edge, the airfoil portion defines a blade span between the root portion and the tip;

attaching a composite woven skin to the non-woven composite main body at the main body outer surface;

attaching a metallic sheath to the composite woven skin opposite the main body outer surface proximate the leading edge; and attaching the composite tip and trailing edge reinforcement wrap to the composite woven skin opposite the core outer surface;

locating the composite tip and trailing edge reinforcement wrap from the trailing edge and extending across the airfoil portion chordwise from the trailing edge to portions of the metallic sheath and extending spanwise from the tip along the airfoil portion to a predetermined distance of the blade span; and covering the airfoil portion with the composite tip and trailing edge reinforcement wrap at a location from about 50 percent to about 80 percent of the span from the tip and from the trailing edge chordwise from about 50 percent tapering to zero.

* * * * *